June 5, 1923.

W. C. PETERSON

MECHANISM FOR TESTING PISTON RINGS

Filed May 8, 1920

1,457,933

Inventor,
Walter C. Peterson,
By Milton Tibbetts, Atty.

Patented June 5, 1923.

1,457,933

UNITED STATES PATENT OFFICE.

WALTER C. PETERSON, OF DETROIT, MICHIGAN, ASSIGNOR TO PACKARD MOTOR CAR COMPANY, OF DETROIT, MICHIGAN, A CORPORATION OF MICHIGAN.

MECHANISM FOR TESTING PISTON RINGS.

Application filed May 8, 1920. Serial No. 379,773.

*To all whom it may concern:*

Be it known that I, WALTER C. PETERSON, a citizen of the United States, and resident of Detroit, Wayne County, State of Michigan, have invented certain new and useful Improvements in Mechanisms for Testing Piston Rings, of which the following is a specification.

This invention relates to mechanism for testing piston rings.

Piston rings to effectively perform their function, should exert a uniform outward pressure throughout their peripheries, for otherwise, the rings will score the cylinder wall or will wear unevenly. The advantage of ascertaining whether or not a piston ring fulfills the requirements mentioned and exerts a uniform outward pressure, will at once be evident.

The object of the invention is to test piston rings and to determine the outward pressure of a ring at different points on the periphery thereof.

Further objects will appear from the following specification taken in connection with the drawings, which form a part thereof and in which.

Figure 1:
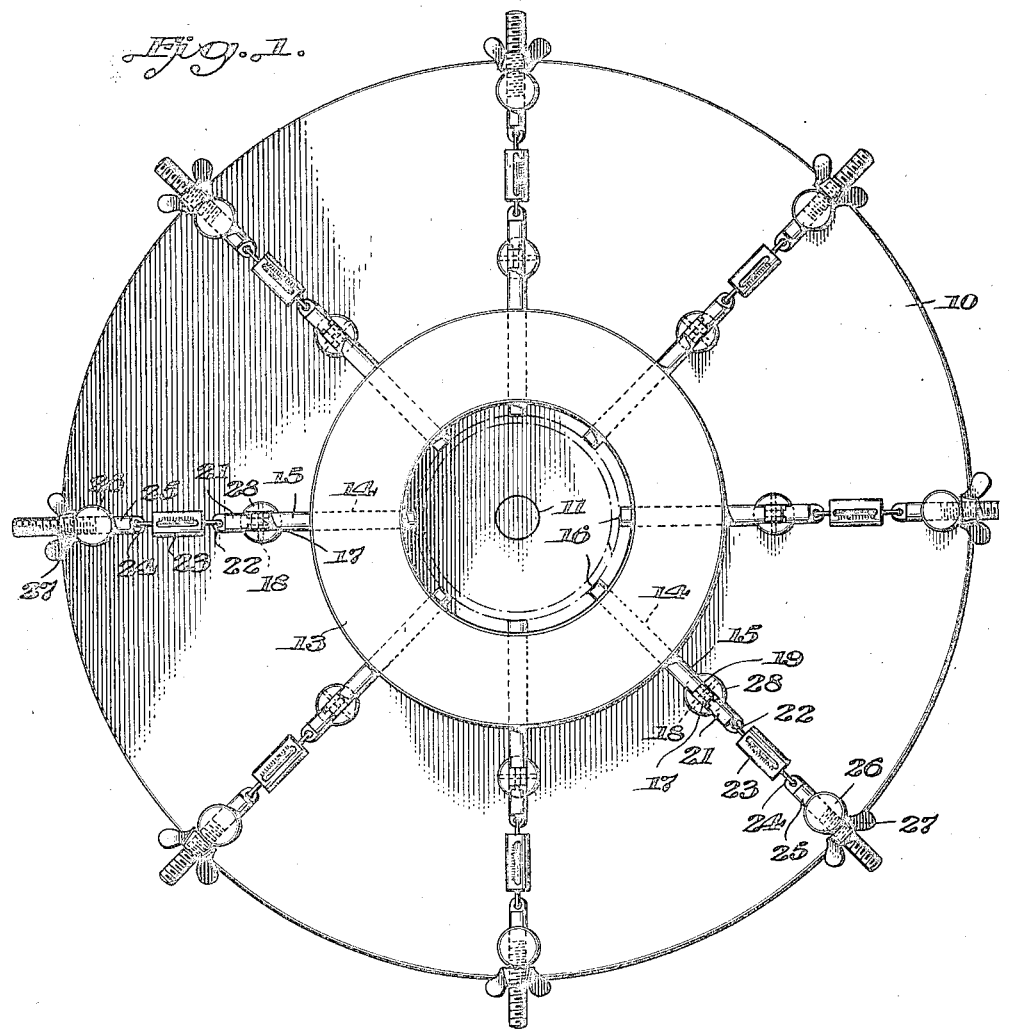
Fig. 1 is a top plan view illustrating the invention.
Figure 2:
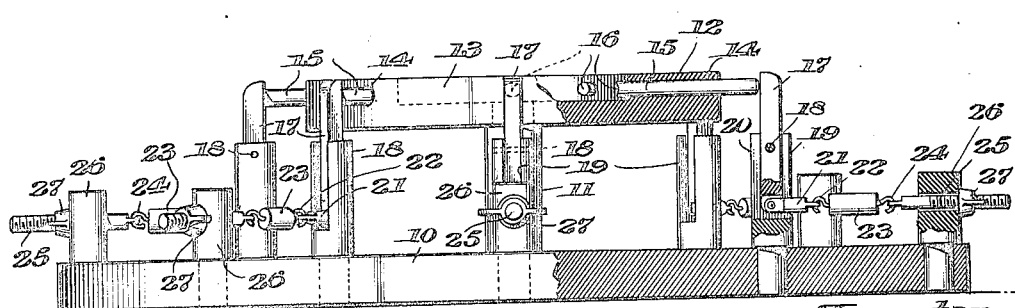
Fig. 2 is an elevational view, partly broken away, of the construction shown in Fig. 1.

The testing mechanism shown in the drawings comprises a base 10 having central supporting post or standard 11 secured thereto, a disc 12 being supported on the upper end of the post 11. The disc 12 is provided with a centrally disposed annular recess 13 and a plurality of openings 14 extend upwardly in a radial direction as shown in Fig. 1. A plurality of pins 15 are slidably mounted in the openings 14 and are slightly curved at their inner ends, as shown at 16, these ends being adapted to engage the outer surface of the ring being tested. The pins 15 are forced inwardly by plurality of levers 17, each of these levers being pivoted, as shown at 18, in a longitudinally extending slot or recess 19 formed in a supporting post 20. As illustrated in Fig. 1, the posts are disposed in radial alignment with the pins 15. Each of the levers 17 has pivotally connected thereto at its lower end a link 21, the other end of the link being connected, as shown at 22, to one end of a spring balance 23. The other end of the spring balance 23 is connected as shown at 24 to a screw threaded pin or rod 25, each of the rods 25 being slidably mounted in the post 26. In order to put tension on and draw the pins 25 through the posts 26, each of the pins has threaded thereon a wing nut 27. Referring to Fig. 1 it will be seen that the posts 26 are also disposed in alignment with the pins 15 and posts 20.

A brief description of the operation of the construction above described and of the method of testing piston rings by means of this mechanism, will now be given.

The piston ring to be tested is placed in the recess 13 of the disc 12, it being understood of course, that the ring is expanded, no pressure being exerted upon it when the ring is placed in the recess. In order to close the ring, pressure is gradually applied at successive points on the periphery of the ring and in order to so apply the pressure, the wing nuts are turned on the pins 25, the nuts on successive pins around the periphery being manipulated. As the nuts are turned, the pins 25 will be drawn outwardly through the fixed posts 26 and will communicate this movement through the spring balances 23 and links 21 to the levers 17, the upper ends of the levers coming directly in contact with or engaging the outer ends of the pins 15 and as the lower ends of the levers are moved outwardly the upper ends of the levers will move inwardly thereby forcing the pins against the ring. It will be understood that the ring should be substantially centered in the recess 13 of the disc 12 by means of this successive manipulation of the tightening devices and this tightening operation is continued by turning the successive wing nuts until the opening or split in the ring has been entirely closed. It will also be understood that the spring balances or scales 23 are so calibrated as to indicate the pressure required at the different points on the periphery to close the ring. If the test applied as above outlined indicates that substantially the same pressure is exerted at the various points on the periphery of the ring it will be evident that the ring so tested fulfills the requirements and should prove satisfactory in actual use.

From the above description, it will be clear that a simple, practical and efficient device for testing piston rings has been designed and a device produced by means of which rings of this character may be easily and quickly tested.

While I have in the above specification described one specific embodiment of the invention, it will be evident that modification and changes may be made without departing from the spirit or scope of invention as specified in the following claims.

Having described my invention, what I claim and desire to secure by Letters Patent is:

1. A piston ring testing machine comprising a supporting member, a plurality of pins slidably mounted therein and extending radially from the center of said member, levers actuating said pins, means for gradually moving said levers, and pressure indicating means disposed between said last named means and said levers.

2. A piston ring testing machine comprising a supporting member, a plurality of radially mounted pins slidably carried by said member, levers for actuating said pins, a plurality of posts disposed radially with respect to said pins, screw threaded pins slidably mounted in said posts, means engaging said pins for moving said pins with respect to said posts, and connecting means between said pins and said levers and including pressure indicating means.

In testimony whereof I affix my signature.

WALTER C. PETERSON.